(12) United States Patent
Shibasaki (10) Patent No.: US 11,822,209 B2
(45) Date of Patent: Nov. 21, 2023

(54) COVER OPENING AND CLOSING DEVICE

(71) Applicant: Panasonic Intellectual Property Management Co., Ltd., Osaka (JP)

(72) Inventor: Kazuki Shibasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/554,223

(22) Filed: Dec. 17, 2021

(65) Prior Publication Data

US 2023/0004069 A1 Jan. 5, 2023

(30) Foreign Application Priority Data

Jun. 30, 2021 (JP) ................................ 2021-109480

(51) Int. Cl.
*G03B 11/04* (2021.01)

(52) U.S. Cl.
CPC ................. *G03B 11/043* (2013.01)

(58) Field of Classification Search
CPC .............. G03B 11/043; G06F 1/686
See application file for complete search history.

(56) References Cited

U.S. PATENT DOCUMENTS

| 11,422,434 | B2* | 8/2022 | Choi | ........... | H04N 5/225 |
| 11,422,435 | B1* | 8/2022 | Sathe | ........... | G03B 11/041 |
| 2011/0115924 | A1 | 5/2011 | Yu et al. | | |
| 2021/0200061 | A1* | 7/2021 | Kanas | ........... | F16B 1/00 |
| 2021/0208478 | A1* | 7/2021 | Kanas | ........... | G06F 1/1686 |
| 2021/0333686 | A1* | 10/2021 | Park | ........... | G03B 11/041 |

FOREIGN PATENT DOCUMENTS

| EP | 1 833 241 | 9/2007 |
| JP | 4177976 | 11/2008 |
| JP | 2019-8037 | 1/2019 |
| WO | 2019/156683 | 8/2019 |

OTHER PUBLICATIONS

Extended European Search Report dated Jun. 28, 2022 for the related European Patent Application No. 22151913.5.

* cited by examiner

Primary Examiner — Clayton E. LaBalle
Assistant Examiner — Diana Hancock
(74) Attorney, Agent, or Firm — WENDEROTH, LIND & PONACK L.L.P.

(57) ABSTRACT

A cover opening and closing device is a cover opening and closing device for shielding an object, the cover opening and closing device including a cover attractable to or repellable by a magnet, a guide accommodating the cover, and a housing covering the guide. The cover is accommodated in a space between the guide and the housing. The guide allows the cover to be moved, by the magnet outside the space, between a first position where the cover shields the object and a second position where the cover does not shield the object.

20 Claims, 7 Drawing Sheets

COVER OPENING AND CLOSING DEVICE

BACKGROUND

1. Technical Field

The present disclosure relates to a cover opening and closing device for opening and closing a cover for an object.

2. Description of the Related Art

Unexamined Japanese Patent Publication No. 2019-8037 discloses a camera having a sliding-type of lens protective cover. The camera includes a cover part provided on a front surface of the camera and manually movable, and a lens part (object) to be shielded by the slid cover. This allows a user to open and close the cover to protect the lens part (object).

SUMMARY

The present disclosure provides a cover opening and closing device in which a cover can be opened and closed without being directly touched.

A cover opening and closing device according to one aspect of the present disclosure is a cover opening and closing device for shielding an object, the cover opening and closing device including a cover attractable to or repellable by a magnet, a guide accommodating the cover, and a housing covering the guide. The cover is accommodated in a space between the guide and the housing. The guide allows the cover to be moved, by the magnet outside the space, between a first position where the cover shields the object and a second position where the cover does not shield the object.

According to the present disclosure, the cover can be opened and closed without being directly touched.

DETAILED DESCRIPTION

Exemplary embodiments will be described below in detail with reference to the drawings as appropriate. However, descriptions more detailed than necessary may be omitted. For example, detailed descriptions of already well-known matters, and duplicated descriptions of substantially identical configurations may be omitted. These omissions are intended to avoid excessive redundancy in the following description, and to facilitate understanding of those skilled in the art. Note that the accompanying drawings and the following description are provided for those skilled in the art to fully understand the present disclosure, and are not intended to limit the subject matter recited in the appended claims.

Moreover, in the following exemplary embodiments, a description will be given of an example in which a cover opening and closing device is mounted on a monitor (which is an example of a display apparatus) to be attached to a passenger seat of an aircraft. However, the present disclosure is not limited to this example.

First Exemplary Embodiment

A first exemplary embodiment will be described below with reference to FIGS. 1 to 6.

[1-1. Configuration]

Figure 1:
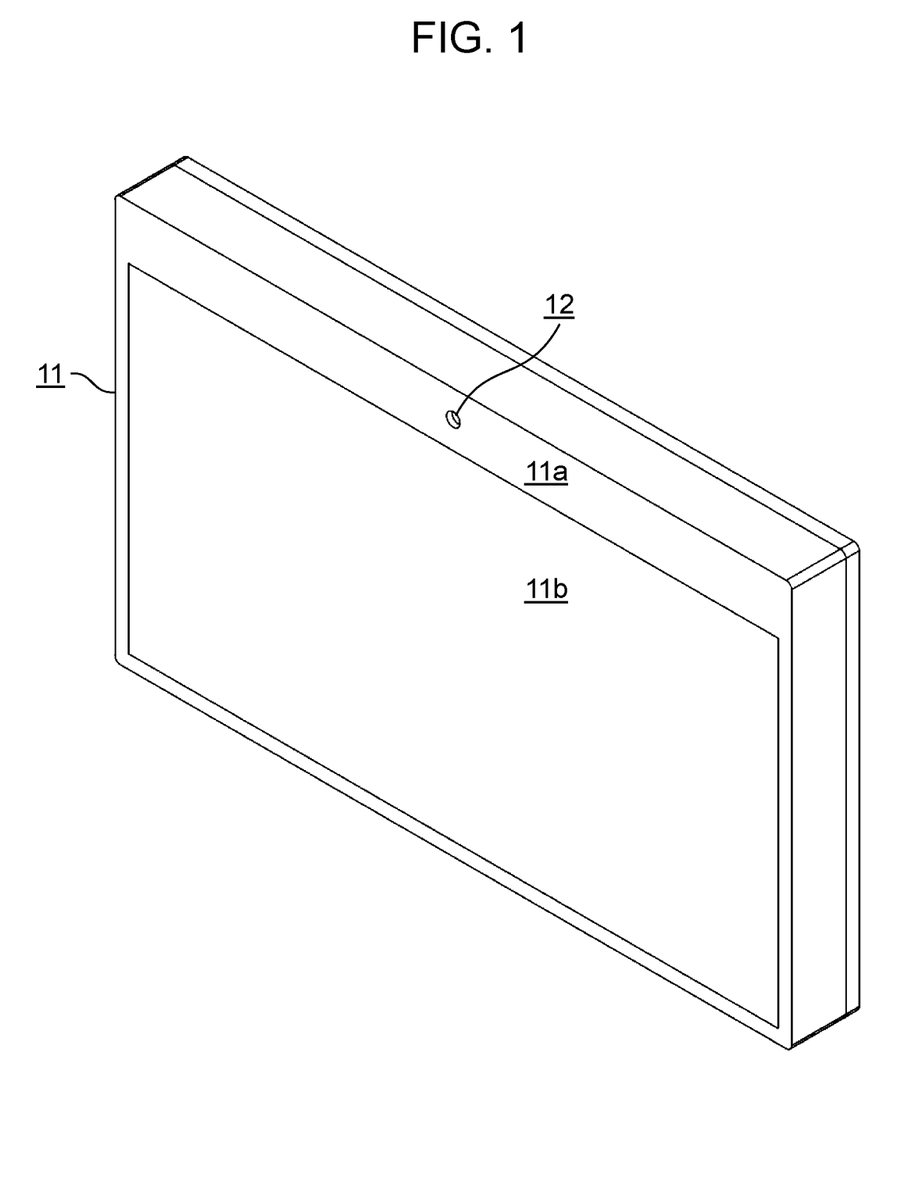
FIG. 1 is an external view of a monitor having a cover opening and closing device built therein according to a first exemplary embodiment.

FIG. 1 is an external view of a monitor having a cover opening and closing device built therein according to the first exemplary embodiment. Monitor 11 includes frame 11a that is an outer portion of monitor 11 and display 11b that is a portion where an image is displayed. Frame 11a is an example of a housing of the cover opening and closing device and thus an example of a housing of monitor 11. Frame 11a includes transmission part 12. Frame 11a includes a camera mounted therein. The camera can capture an image through transmission part 12.

Frame 11a is made of a material, such as resin, aluminum, or glass, which does not have a magnetic force by itself and can transmit a magnetic force.

Transmission part 12 is a transparent circular member. For example, transmission part 12 is made of transparent resin or transparent glass. Note that in the present exemplary embodiment, transmission part 12 is a transparent member and is formed integrally with frame 11a. Frame 11a is a portion that is subjected to decoration, such as coating, which does not allow light to pass therethrough. Transmission part 12 is a portion that is not subjected to decoration, that is, a transparent portion.

Figure 2:
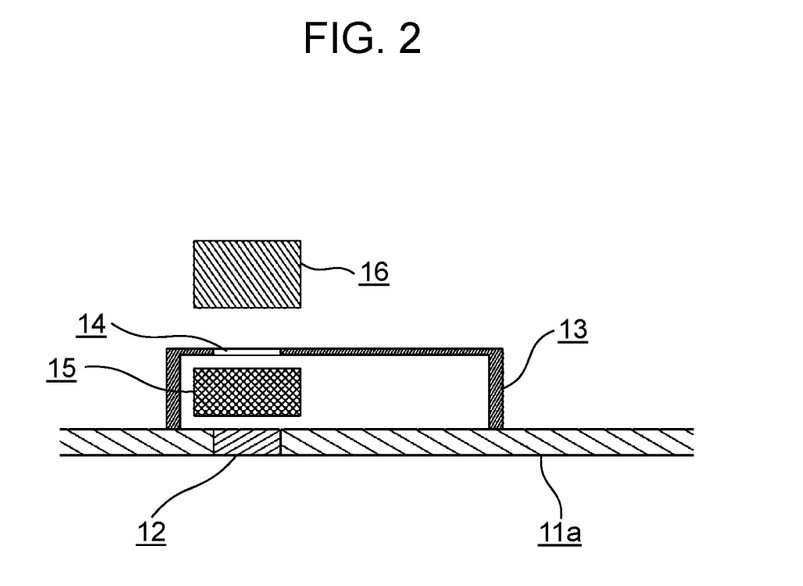
FIG. 2 is a cross-sectional view of an area around a camera and the cover opening and closing device according to the first exemplary embodiment.

FIG. 2 is a cross-sectional view of an area around the camera and the cover opening and closing device according to the first exemplary embodiment. Frame 11a includes camera 16 that is an example of an object. The cover opening and closing device according to the present exemplary embodiment includes guide 13 disposed between frame 11a and camera 16 and fixed to frame 11a, and cover 15 movable within guide 13. That is, guide 13 accommodates cover 15. More specifically, cover 15 is accommodated in a space between guide 13 and frame 11a.

Figure 3:
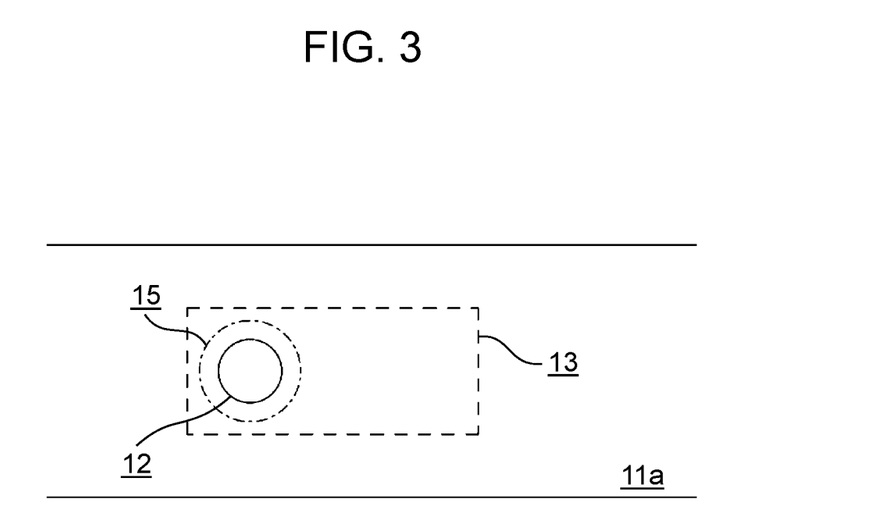
FIG. 3 is an explanatory enlarged view of an area around the cover opening and closing device with the camera being shielded by a cover according to the first exemplary embodiment.
Figure 4:
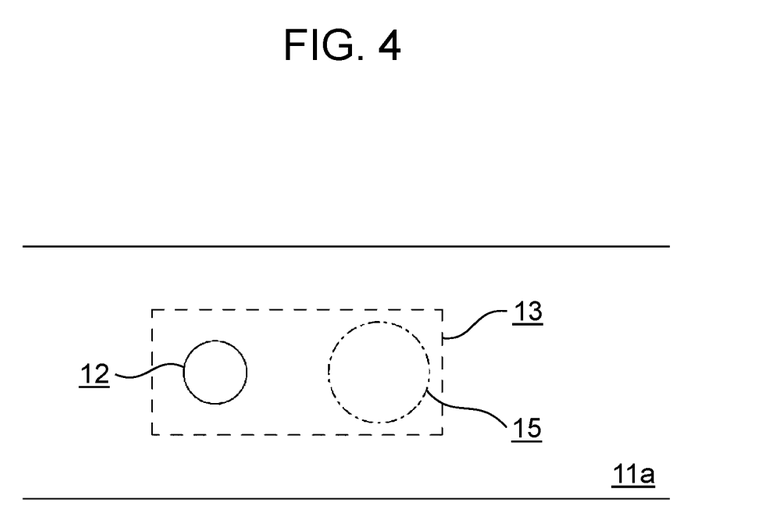
FIG. 4 is an explanatory enlarged view of the area around the cover opening and closing device with the camera not being shielded by the cover according to the first exemplary embodiment.

Guide 13 has opening 14, through which camera 16 can capture an image, at a position between camera 16 and transmission part 12. In addition, in order not to affect an operation of cover 15, guide 13 is made of a material, such as resin, which does not have a magnetic force by itself and can transmit a magnetic force. Cover 15 can move, along guide 13, between a first position where cover 15 overlaps camera 16 and shields camera 16 as illustrated in FIG. 3 and a second position where cover 15 does not shield camera 16 as illustrated in FIG. 4. FIG. 3 and FIG. 4 will be described later. Guide 13 has a lateral dimension more than twice a lateral dimension of cover 15 such that cover 15 moved to the second position does not shield camera 16. A lateral direction of guide 13 corresponds to a longitudinal direction of guide 13, for example. A lateral direction of cover 15 corresponds to a longitudinal direction of cover 15, for example. In the first exemplary embodiment, guide 13 has a rectangular cross section, with its long side directed laterally, between transmission part 12 and opening 14.

Opening 14 is disposed on an optical axis of camera 16 and has a dimension such that a field of view of camera 16 is not shielded. For example, opening 14 is formed by hollowing out a portion of guide 13, or is embedded with transparent resin or transparent glass that allows light to pass through. In the first exemplary embodiment, opening 14 is formed by hollowing out guide 13 into a cylindrical shape so as to have a diameter the same as that of transmission part 12.

Cover 15 is a member including a magnetically attractive material or a magnetically repulsive material. Examples of the magnetically attractive material include an iron-based material and a heteropolar magnet. An example of the magnetically repulsive material includes a homopolar magnet. In this case, one surface of each of magnet 17 and cover 15 is a monopolar magnet. For attraction, cover 15 is disposed with its pole different from that of magnet 17 being directed to a surface of frame 11a. For repulsion, cover 15 is disposed with its pole the same as that of magnet 17 being directed to the surface of frame 11a. Cover 15 has a thickness less than a depthwise dimension of guide 13. A depth direction of guide 13 corresponds to a normal direction of frame 11a or a normal direction of a display surface of display 11b. Cover 15 has a heightwise dimension and a lateral dimension that are less than a heightwise dimension of guide 13, but are equal to or greater than a heightwise dimension of transmission part 12. A height direction of cover 15 corresponds to a height direction of monitor 11. The lateral direction of cover 15 corresponds to a lateral direction of monitor 11, for example, a longitudinal direction of monitor 11. In the first exemplary embodiment, cover 15 has a cylindrical shape having a diameter greater than that of transmission part 12. Under no magnetic force applied to cover 15, cover 15 is in contact, on its lower surface, with guide 13 by its own weight. At this time, cover 15 is in contact, at a certain point, side, or surface somewhere, with guide 13 or frame 11a, due to a gravitational force applied to cover 15 or inclination of cover 15, in a depth direction or in the lateral direction of cover 15 (for example, the longitudinal direction of cover 15).

Next, a moving position of cover 15 will be described with reference to FIGS. 3 and 4. FIG. 3 is an explanatory enlarged view of an area around the cover opening and closing device with the camera being shielded by the cover according to the first exemplary embodiment. FIG. 4 is an explanatory enlarged view of the area around the cover opening and closing device with the camera not being shielded by the cover according to the first exemplary embodiment.

As illustrated in FIG. 3, cover 15 shielding camera 16 and transmission part 12 are set in the same position. As illustrated in FIG. 3, when cover 15 is positioned so as to shield camera 16, camera 16 cannot capture an image of a subject at a position facing monitor 11.

On the other hand, as illustrated in FIG. 4, when cover 15 is positioned so as not to shield camera 16, camera 16 can capture, through opening 14 and transmission part 12, an image of the subject at the position facing monitor 11.

[1-2. Operation]

Figure 5:
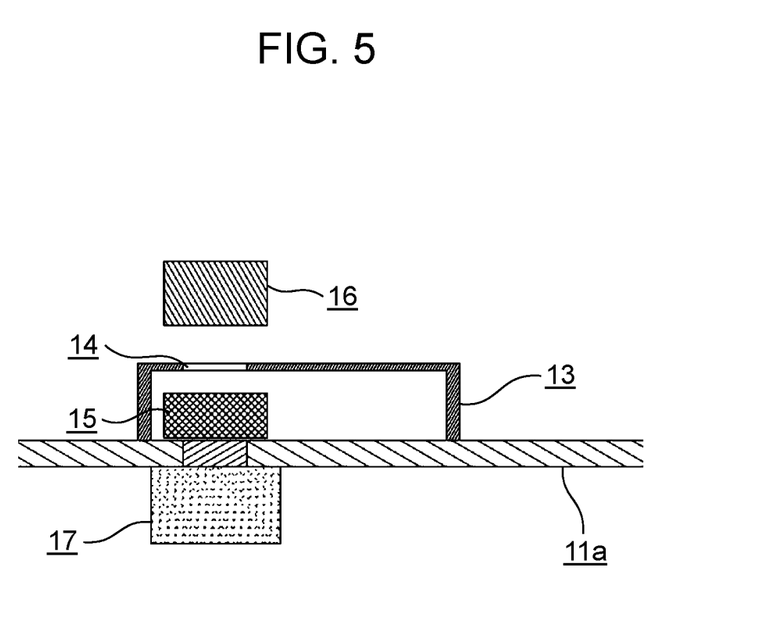
FIG. 5 is an explanatory cross-sectional view of the area around the cover opening and closing device with the cover being moved by a magnet to a first position where the cover shields the camera in the first exemplary embodiment.
Figure 6:
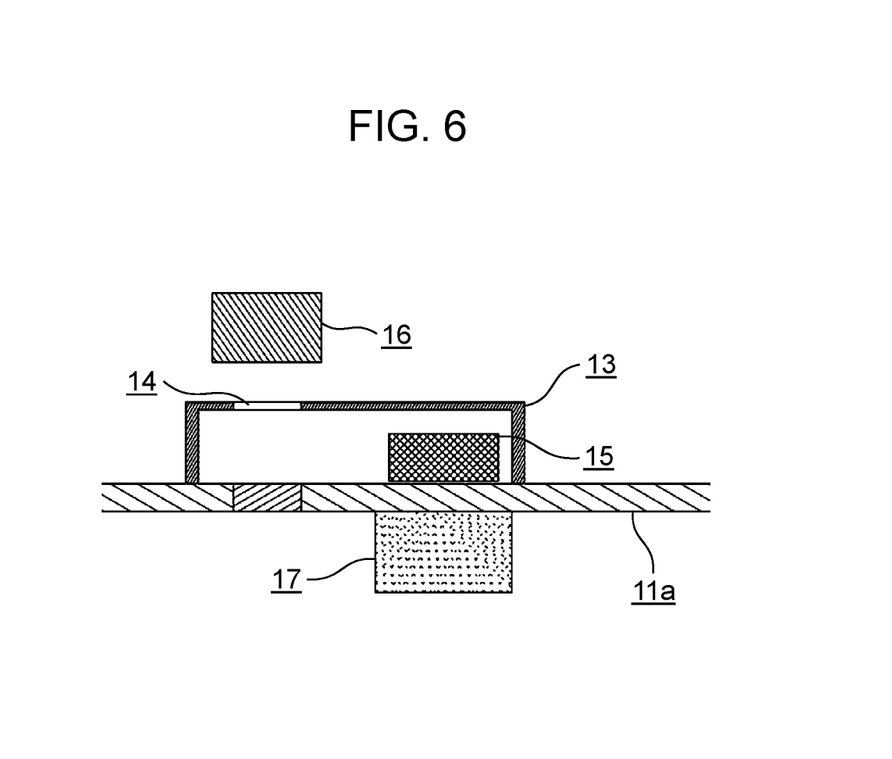
FIG. 6 is an explanatory cross-sectional view of the area around the cover opening and closing device with the cover being moved by the magnet to a second position where the cover does not shield the camera in the first exemplary embodiment.

An operation of the cover opening and closing device configured as described above will be described with reference to FIGS. 5 and 6. FIG. 5 is an explanatory cross-sectional view of the area around the cover opening and closing device with the cover attracted to the magnet being moved to the position where the cover shields the camera in the first exemplary embodiment. FIG. 6 is an explanatory cross-sectional view of the area around the cover opening and closing device with the cover being moved by the magnet to the position where the cover does not shield the camera in the first exemplary embodiment.

Cover 15 includes a magnetically attractive material. When magnet 17 is brought close to the surface of frame 11a, cover 15 is attracted to the magnet and brought close to frame 11a. In this state, magnet 17 is moved in the lateral direction, and thereby, cover 15 can be moved under an attractive force of magnet 17 to the second position where cover 15 does not shield camera 16 as illustrated in FIG. 6. Here, when magnet 17 is brought away from the surface of frame 11a, in a case where the lower surface of cover 15 is in contact with guide 13, cover 15 rests on guide 13, and in a case where cover 15 is floating from guide 13, cover 15 drops onto and rests on guide 13. When cover 15 at the second position where cover 15 does not shield camera 16 as illustrated in FIG. 6 is to be moved to the first position where cover 15 shields camera 16 as illustrated in FIG. 5, magnet 17 needs only to be brought close to the surface of frame 11a and oppositely moved from the second position.

In a case where cover 15 includes a magnetically repulsive material, when magnet 17 is brought close to the surface of frame 11a, cover 15 repels the magnet and moves away from frame 11a. In this state, magnet 17 is positionally moved in the lateral direction (for example, the longitudinal direction of cover 15), and thereby, cover 15 can be moved under a repulsive force of magnet 17 to the second position where cover 15 does not shield camera 16 as illustrated in FIG. 6. Here, when magnet 17 is brought away from the surface of frame 11a, in the case where the lower surface of cover 15 is in contact with guide 13, cover 15 rests on guide 13, and in the case where cover 15 is floating from guide 13, cover 15 drops onto and rests on guide 13. When cover 15 at the second position where cover 15 does not shield camera 16 is to be moved to the first position where cover 15 shields camera 16, as in the case where cover 15 is attracted to magnet 17, magnet 17 needs only to be brought close to the surface of frame 11a and moved. As described above, guide 13 is configured to allow magnet 17 to move cover 15 between the first position where cover 15 shields camera 16 and the second position where cover 15 does not shield camera 16.

[1-3. Effects and the Like]

As described above, in the present exemplary embodiment, monitor 11 includes camera 16 and cover 15 that is magnetically movable.

This prevents cover 15 from being directly touched from the outside of monitor 11. Thus, for example, an airline that provides monitor 11 can prevent, for example, a passenger using monitor 11 from moving the position of cover 15. Furthermore, when the cover needs to be opened and closed, cover 15 can be moved from the outside of monitor 11 by using a magnet.

Second Exemplary Embodiment

A second exemplary embodiment will be described below with reference to FIGS. 7 and 8.

[2-1. Configuration]

Figure 7:
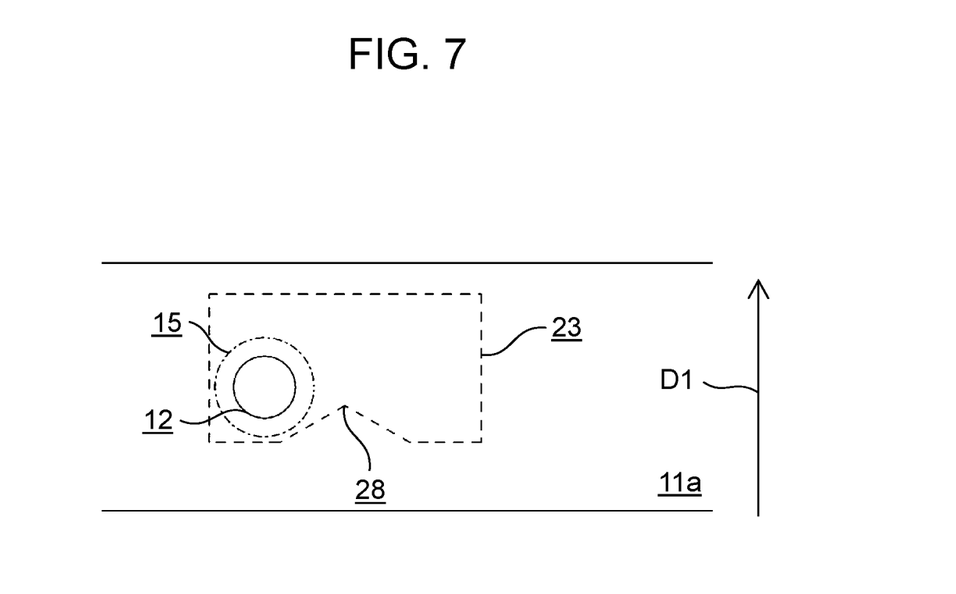
FIG. 7 is an explanatory enlarged view of an area around a cover opening and closing device with an object being shielded by a cover according to a second exemplary embodiment.
Figure 8:
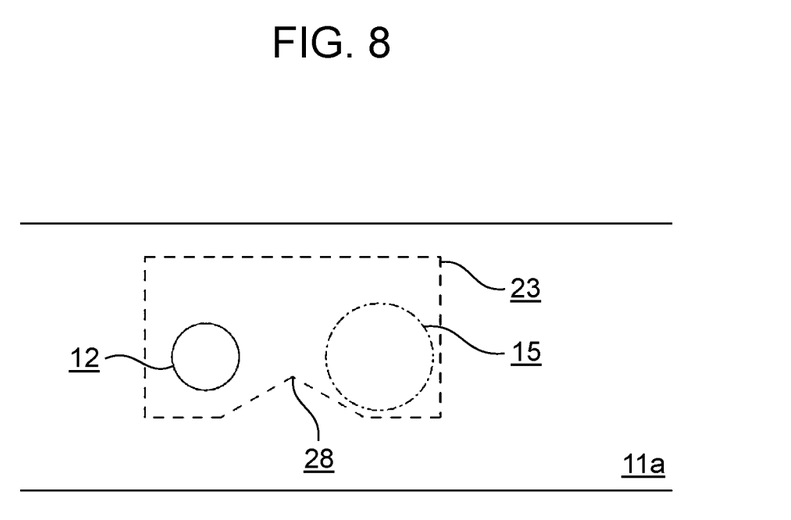
FIG. 8 is an explanatory enlarged view of the area around the cover opening and closing device with the object not being shielded by the cover according to the second exemplary embodiment.

FIG. 7 is an explanatory enlarged view of an area around a cover opening and closing device with an object being shielded by a cover according to the second exemplary embodiment. FIG. 8 is an explanatory enlarged view of the area around the cover opening and closing device with the object not being shielded by the cover according to the second exemplary embodiment. Guide 23 is basically the same as guide 13 according to the first exemplary embodiment in terms of a material and a relationship between the guide and each of transmission part 12 and opening 14. However, guide 23 has a third position between the first position where cover 15 shields camera 16 and the second position where cover 15 does not shield camera 16, the third position being a position where guide 23 has, on its lower side, a freely selected portion raised like protrusion 28 in a direction opposite to a direction of gravitational force applied to monitor 11. That is, protrusion 28 protrudes in vertical direction D1 (see FIG. 7). Protrusion 28 can prevent cover 15 under no magnetic force applied thereto from moving between the first position where cover 15 shields camera 16 and the second position where cover 15 does not shield camera 16. Cover 15 is movable along guide 23.

[2-2. Operation]

An operation of the cover opening and closing device configured as described above will be described below. Since the freely selected portion on the lower side of guide 23 is raised like protrusion 28 in the direction opposite to the direction of gravitational force applied to monitor 11, cover 15 is guided by its own weight to either the first position where cover 15 shields camera 16 as illustrated in FIG. 7 or the second position where cover 15 does not shield camera 16 as illustrated in FIG. 8, without stopping at any position, such as the third position, between the first position and the second position. In order to move cover 15 between the first position and the second position, similarly to the first exemplary embodiment, magnet 17 is brought close to the surface of frame 11a to cause cover 15 to attract or repel and to be moved.

[2-3. Effects and the Like]

As described above, in the present exemplary embodiment, with provision of protrusion 28 in guide 23, cover 15 spontaneously moves by its own weight to either the first position where cover 15 shields camera 16 or the second position where cover 15 does not shield camera 16. As long as cover 15 is not moved by using magnet 17, it is possible to reduce an unintended positional change of cover 15, which is caused by vibrations or the like, between the first position where cover 15 shields camera 16 and the second position where cover 15 does not shield camera 16.

This makes it possible to reduce the movement of cover 15 beyond the third position, for example, even when cover 15 undergoes vibrations transmitted from an aircraft, and involves changes in the direction of gravitational force due to a tilt of the aircraft.

Third Exemplary Embodiment

Figure 10:
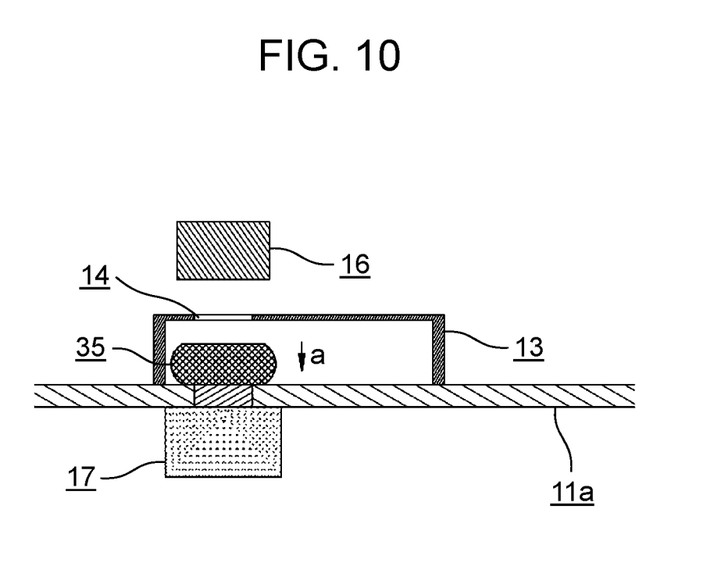
FIG. 10 is an explanatory cross-sectional view of the area around the cover opening and closing device with the cover being attracted to a magnet and one of the elastic forces being reduced in the third exemplary embodiment.
Figure 11:
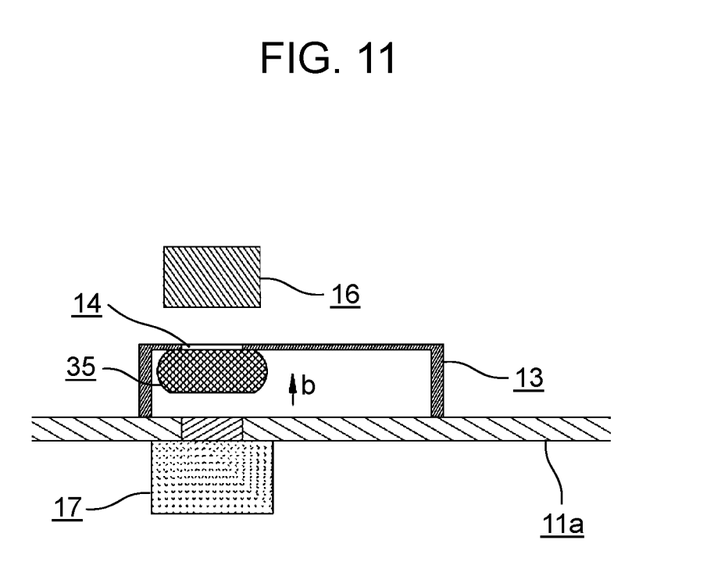
FIG. 11 is an explanatory cross-sectional view of the area around the cover opening and closing device with the cover repelling the magnet and one of the elastic forces being reduced in the third exemplary embodiment.

A third exemplary embodiment will be described below with reference to FIGS. 9 to 11.

[3-1. Configuration]

Figure 9:
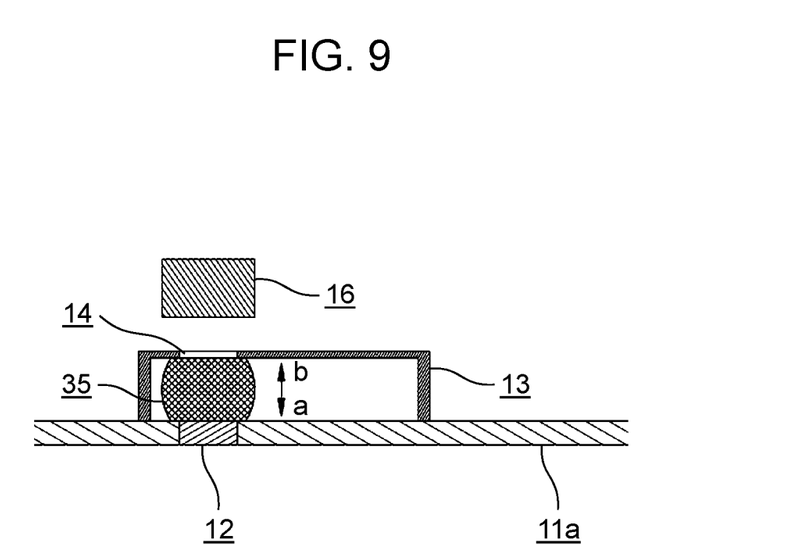
FIG. 9 is an explanatory cross-sectional view of an area around a cover opening and closing device with a cover having elastic forces acting in both directions of a depth according to a third exemplary embodiment.

FIG. 9 is an explanatory cross-sectional view of an area around a cover opening and closing device with a cover having elastic forces acting in both directions (two-way directions) of a depth according to the third exemplary embodiment. Cover 35 has a depthwise natural length greater than a width of guide 13. Cover 35 under no magnetic force applied thereto has repulsive elastic forces acting in both direction a and direction b. For example, cover 35 integrally includes a plurality of different components as a configuration in which a magnetically attractive portion or a magnetically repulsive portion containing iron powder or the like is provided at a periphery (edge) of an elastically deformable portion made of rubber or resin. Alternatively, for example, cover 35 includes one component such as an elastic body including rubber or resin blended with iron powder. Then, cover 35 is deformed when being attracted to or repelled by a magnetic force. The heightwise dimension and the lateral dimension of cover 35 are less than the heightwise dimension of guide 13, but are equal to or greater than the dimension of transmission part 12. In the third exemplary embodiment, cover 35 has a cylindrical shape having a diameter greater than that of transmission part 12. Cover 35 is movable along guide 13.

[3-2. Operation]

An operation of the cover opening and closing device configured as described above will be described with reference to FIGS. 9 to 11. FIG. 10 is an explanatory cross-sectional view of the area around the cover opening and closing device with the cover being attracted to a magnet and one of the elastic forces being reduced in the third exemplary embodiment. FIG. 11 is an explanatory cross-sectional view of the area around the cover opening and closing device with the cover repelling the magnet and one of the elastic forces being reduced in the third exemplary embodiment. As illustrated in FIG. 9, cover 35 under no magnetic force thereto is fixed by repulsive forces acting in both direction a and direction b of the depth and frictional forces acting on both surfaces of cover 35. As illustrated in FIG. 10, when cover 35 is attracted to magnet 17, cover 35 is deformed in direction a and the repulsive force acting in direction b is reduced. Thus, cover 35 is no longer fixed. On the other hand, as illustrated in FIG. 11, when cover 35 is repelled by magnet 17, cover 35 is deformed in direction b and the repulsive force acting in direction a is reduced. Thus, cover 35 is no longer fixed. With one repulsive force being reduced as illustrated in FIGS. 10 and 11, cover 35 can be moved together with lateral movement of magnet 17. Then, when magnet 17 is brought away from the surface of frame 11a, the deformation of cover 35 is restored, and the repulsive forces act on both direction a and direction b again, resulting in fixing of cover 35.

[3-3. Effects and the Like]

As described above, in the present exemplary embodiment, cover 35 is positionally fixed by the repulsive forces in the depth direction, and restrained from being positionally changed as long as cover 35 is not moved by using magnet 17.

This makes it possible to restrain the movement of cover 35, for example, even when cover 35 undergoes vibrations transmitted from an aircraft, and involves changes in the direction of gravitational force due to a tilt of the aircraft.

Fourth Exemplary Embodiment

A fourth exemplary embodiment will be described below with reference to FIGS. 12 and 13.

[4-1. Configuration]

Figure 12:
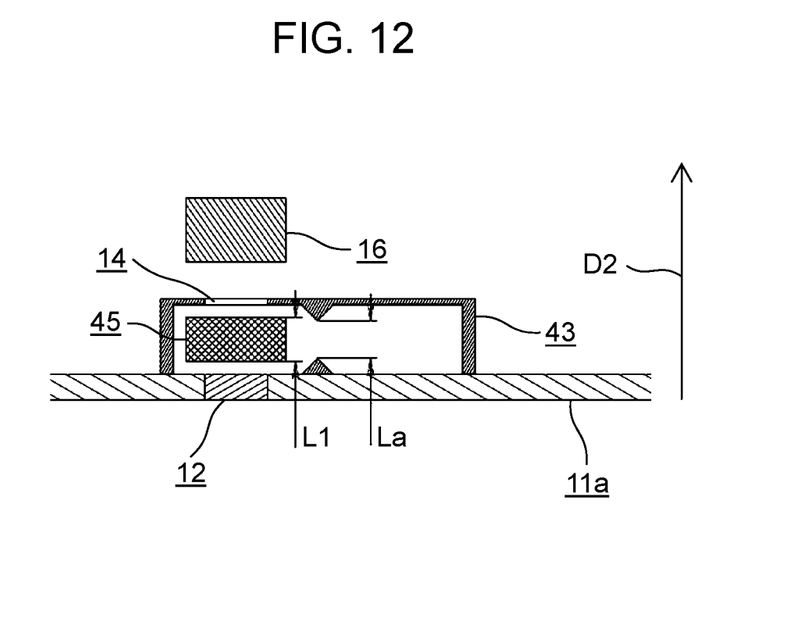
FIG. 12 is an explanatory cross-sectional view of an area around a cover opening and closing device with an object being shielded by a cover in a fourth exemplary embodiment.

FIG. 12 is an explanatory cross-sectional view of an area around a cover opening and closing device with an object being shielded by a cover in the fourth exemplary embodiment. Guide 43 is basically the same as guide 13 according to the first exemplary embodiment in terms of a material and a relationship between the guide and each of transmission part 12 and opening 14. However, guide 43 has a third position, at which guide 43 has narrowed width La in a depth of a freely selected portion, between a first position where cover 45 shields camera 16 and a second position where cover 45 does not shield camera 16. At the third position, guide 43 has portions protruding from both sides thereof in the depth direction and thereby has the narrowed width.

For example, cover 45 integrally includes a plurality of different components as a configuration in which a magnetically attractive portion or a magnetically repulsive portion containing iron powder or the like is provided at a periphery (edge) of an elastically deformable portion made of rubber or resin. Alternatively, for example, cover 45 includes one component such as an elastic body including rubber or resin blended with iron powder. Cover 45 under no magnetic force applied thereto has a natural length having width L1 greater than width La at the third position of guide 43. However, when cover 45 is deformed by a magnetic force as illustrated in FIG. 13 to be described later, cover 45 has a length having width L2 less than width La at the third position of guide 43. Cover 45 having a thickness across width L1 cannot pass through the third position of guide 43 because width L1 is greater than width La. Cover 45 deformed to a shape having width L2 can pass through the third position because width L2 is less than width La. The heightwise dimension and the lateral dimension of cover 45 are less than the heightwise dimension of guide 43, but are equal to or greater than the dimension of transmission part 12. In the fourth exemplary embodiment, cover 45 has a cylindrical shape having a diameter greater than that of transmission part 12. Cover 45 is movable along guide 43. As described above, guide 43 has a clearance at the third position. The clearance has a predetermined length (width La) in depth direction D2 (see FIG. 12) of frame 11a.

[4-2. Operation]

An operation of the cover opening and closing device configured as described above will be described with reference to FIGS. 12 and 13. FIG. 13 is an explanatory cross-sectional view of the area around the cover opening and closing device with the cover being magnetically deformed and passing through the narrowed position in the fourth exemplary embodiment. When cover 45 is at the first position where cover 45 shields camera 16 as illustrated in FIG. 12, cover 45 under no magnetic force applied thereto is not subjected to a force by which cover 45 is fixed. Therefore, when cover 45 undergoes vibrations transmitted from an aircraft, and involves changes in the direction of gravitational force due to a tilt of the aircraft, cover 45 freely moves. However, since width L1 of cover 45 is greater than width La at the third position of guide 43, cover 45 does not move to the second position beyond the third position. The same holds true for the case of cover 45 being at the second position, and cover 45 does not move to the first position from the second position beyond the third position.

Figure 13:
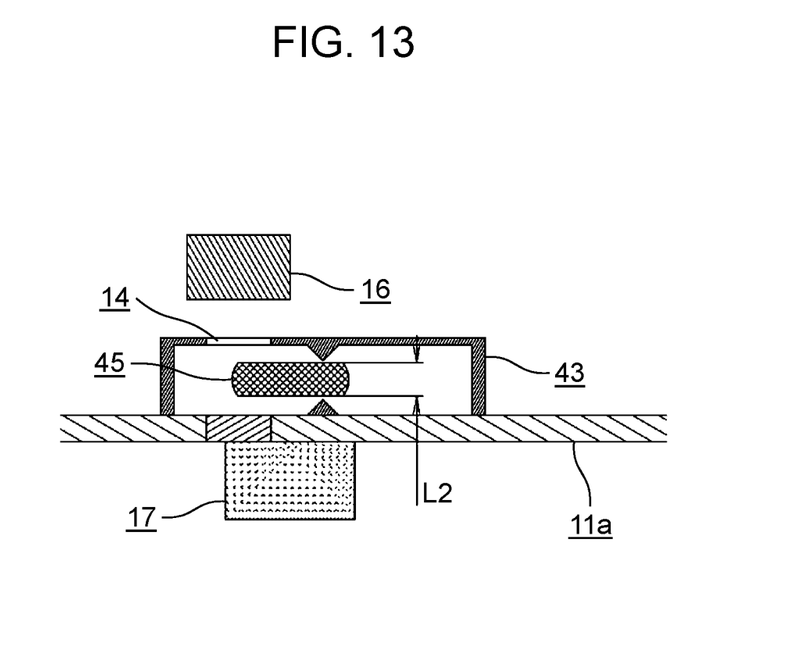
FIG. 13 is an explanatory cross-sectional view of the area around the cover opening and closing device with the cover being magnetically deformed and passing through a narrowed position in the fourth exemplary embodiment.

However, as illustrated in FIG. 13, when magnet 17 applies a magnetic force to cover 45, cover 45 is deformed by an attractive force or a repulsive force to a shape having width L2 less than width La of the narrowed portion of guide 43. At this time, cover 45 passes through the third position of guide 43 to be switched between the first position where cover 45 shields camera 16 and the second position where cover 45 does not shield camera 16.

[4-3. Effects and the Like]

As described above, in the present exemplary embodiment, since depthwise thickness L1 of cover 45 is greater than width La of the narrowed portion of guide 43, cover 45 can be restrained from being positionally changed beyond the third position as long as cover 45 is not moved by using magnet 17.

This makes it possible to restrain the movement of cover 45 between the first position and the second position beyond the third position, for example, even when cover 45 undergoes vibrations transmitted from an aircraft, and involves changes in the direction of gravitational force due to a tilt of the aircraft.

Other Exemplary Embodiments

The first to fourth exemplary embodiments have been described above as examples of the techniques disclosed in the present application. However, the techniques of the present disclosure are not limited to the first to fourth exemplary embodiments, and can also be applied to exemplary embodiments in which modifications, replacements, additions, omissions, and the like are made. In addition, new exemplary embodiments can be made by combining the constituent elements described in the first to fourth exemplary embodiments. In particular, the second exemplary embodiment may be combined with the third exemplary embodiment and the fourth exemplary embodiment.

Other exemplary embodiments will be described below as an example.

Although the shapes of transmission part 12, guide 13, opening 14, and cover 15 are defined in the first exemplary embodiment, each shape is an example. As long as the similar effect can be obtained, these components may have, for example, a shape having an uneven height and an uneven thickness, and a shape having a combination of curved surface shapes.

In the third exemplary embodiment described above, cover 35 has the repulsive forces in the depth direction. However, the shape is an example. The direction in which the repulsive forces act may be, for example, the height direction instead of the depth direction of guide 13. For example, an elastic body has, for example in its height direction, an upper portion including a magnetically attractive material or a magnetically repulsive material, and is attracted to or repelled by magnet 17 and then moved in the height direction. This causes heightwise deformation of cover 35, and allows cover 35 to be positionally moved by being moved in the lateral direction while keeping the deformed state. When the magnet is brought away from cover 35 after the movement of cover 35, the heightwise deformation of cover 35 is restored, and the elastic forces act in both directions of a height. Thus, the movement of cover 35 can be restrained.

In the fourth exemplary embodiment described above, guide 43 has portions protruding from both sides thereof in the depth direction and thereby has thickness La. However, guide 43 has only to have thickness La less than thickness L1 of cover 45 in a freely selected portion. Therefore, only one of surfaces of guide 43 in the depth direction may have a protruding portion, and the other may be flat.

In the fourth exemplary embodiment described above, guide 43 has the narrowed width in the depth of the freely selected portion. However, the shape is an example. Guide 43 may have the narrowed width, for example, in the height direction instead of the depth direction. For example, an elastic body has, for example in its height direction, an upper portion including a magnetically attractive material or a magnetically repulsive material, and is attracted to or repelled by magnet 17 and then moved in the height direction. This causes heightwise deformation of cover 45, and allows cover 45 to be positionally moved by being moved in the lateral direction while keeping the deformed state. When the magnet is brought away from cover 45 after the movement of cover 45, the heightwise deformation of cover 45 is restored, and the height of cover 45 becomes greater than the height of cover 45 at the third position. Thus, cover 45 can be restrained from being positionally changed beyond the third position.

In the first to fourth exemplary embodiments described above as an example, monitor 11 includes transmission part 12. However, transmission part 12 may be an opening provided in monitor 11.

In the first to fourth exemplary embodiments, transmission part 12 is made of a transparent material. However, transmission part 12 may be made of an opaque material as long as the camera is operable.

In the first to fourth exemplary embodiments, camera 16 is positioned at frame 11a of monitor 11. However, camera 16 may be disposed in display 11b.

In the first to fourth exemplary embodiments, frame 11a and the guide are made of resin having no magnetic force. However, frame 11a and the guide may each have a magnetic force as long as their magnetic forces are weaker than the magnetic force of magnet 17 for operating the cover from the outside of frame 11a and the cover can be operated.

In the first to fourth exemplary embodiments, the moving direction of the cover is the lateral direction. However, the moving direction of the cover may be a direction different from the lateral direction, such as an oblique direction, a lengthwise direction, and a circumferential direction.

In the first to fourth exemplary embodiments described above, camera 16 is built in monitor 11. However, camera 16 may be provided in the outside of monitor 11 so as to operate as a module of the camera by itself rather than being built in monitor 11.

In the first to fourth exemplary embodiments described above, the object is camera 16. However, the object may be any object that needs to be switched between an open state and a closed state. For example, the object may be a sensor configured to detect a state in front of monitor 11, for example, brightness, a distance from the sensor to a close object, a temperature, or the like. For example, the object may be a light source itself or illumination that propagates light from a distant place by refraction or reflection. In addition, the surface of the object and the portion of opening 14 of guide 13 may be decorated with a design or coloring.

In the first to fourth exemplary embodiments, the monitor to be attached to the passenger seat of the aircraft has been described as an example. However, the passenger seat of the aircraft is an example as an attachment destination. The monitor may be attached, for example, to a wall and a ceiling other than the passenger seat. In addition, although an aircraft has been described as an example, another movable body may be possible. For example, the movable body may be a flying body other than an aircraft, a traveling vehicle, and a movable body that can be carried by a user.

Note that, the above exemplary embodiments are to exemplify the techniques in the present disclosure, and therefore, various modifications, replacements, additions, omissions, and the like can be made in the scope of the appended claims or in an equivalent scope thereof.

The present disclosure can be applied to a cover opening and closing device in which a cover can be opened and closed without being touched. Specifically, the present disclosure can be applied to, for example, a monitor itself or a monitor having, at its periphery, a camera, a sensor, decoration, and a function of illuminating.

What is claimed is:

1. A cover opening and closing device for shielding an object, the cover opening and closing device comprising:
   a cover attractable to or repellable by a magnet;
   a guide accommodating the cover; and
   a housing covering the guide,
   wherein
   the cover is accommodated in a space between the guide and the housing,
   the guide allows the cover to be moved, by the magnet outside the space, between a first position where the cover shields the object and a second position where the cover does not shield the object,
   the guide includes a protrusion at a third position between the first position and the second position,
   the protrusion protrudes from a bottom surface of the guide in a vertical direction opposite to a direction of gravitational force such that the bottom surface of the guide at the third position is higher in the vertical direction than the bottom surface of the guide at the first position and the second position, and
   a height of the guide at the third position in the vertical direction is greater than a maximum height of the cover in the vertical direction.

2. The cover opening and closing device according to claim 1, wherein
   the cover has an elastic force that presses the cover against both the guide and the housing, and
   when the magnet is brought close to the cover, the cover is deformed and reduces the elastic force.

3. The cover opening and closing device according to claim 1, wherein
   the guide has a clearance between the first position and the second position, the clearance having a predetermined length in a depth direction of the housing,
   the cover has a first length in the depth direction,
   when the magnet is brought close to the cover, the cover is deformed and changes a length of the cover from the first length to a second length, and
   the predetermined length of the clearance is less than the first length and greater than the second length.

4. The cover opening and closing device according to claim 1, wherein the object is a camera configured to capture an image in a direction toward a front surface of the housing.

5. The cover opening and closing device according to claim 1, wherein the object is a sensor configured to detect a state in front of the housing.

6. The cover opening and closing device according to claim 1, wherein the object has a decorated surface.

7. The cover opening and closing device according to claim 1, wherein the object is a light source.

8. The cover opening and closing device according to claim 1, wherein the housing is a part of a display apparatus.

9. The cover opening and closing device according to claim 1, wherein the housing is installed in a movable body.

10. The cover opening and closing device according to claim 1, wherein
the guide has an opening,
the housing includes a transmission part, and
when the cover is at the first position, the object, the opening, the cover, and the transmission part are aligned.

11. A cover opening and closing device for shielding an object, the cover opening and closing device comprising:
a cover attractable to or repellable by a magnet;
a guide accommodating the cover; and
a housing covering the guide,
wherein
the cover is accommodated in a space between the guide and the housing,
the guide allows the cover to be moved, by the magnet outside the space, between a first position where the cover shields the object and a second position where the cover does not shield the object,
the guide has a clearance between the first position and the second position, the clearance having a predetermined length in a depth direction of the housing,
the cover has a first length in the depth direction,
when the magnet is brought close to the cover, the cover is magnetically deformed and changes a length of the cover from the first length to a second length, and
the predetermined length of the clearance is less than the first length and greater than the second length such that (i) the guide does not allow the cover to be moved between the first position and the second position when the length of the cover is the first length and (ii) the guide allows the cover to be moved between the first position and the second position when the length of the cover is the second length.

12. The cover opening and closing device according to claim 11, wherein
the guide includes a protrusion between the first position and the second position, and
the protrusion protrudes vertically.

13. The cover opening and closing device according to claim 12, wherein the object is a camera configured to capture an image in a direction toward a front surface of the housing.

14. The cover opening and closing device according to claim 12, wherein the object is a sensor configured to detect a state in front of the housing.

15. The cover opening and closing device according to claim 12, wherein the object has a decorated surface.

16. The cover opening and closing device according to claim 12, wherein the object is a light source.

17. The cover opening and closing device according to claim 11, wherein
the cover has an elastic force that presses the cover against both the guide and the housing, and
when the magnet is brought close to the cover, the cover is deformed and reduces the elastic force.

18. The cover opening and closing device according to claim 11, wherein the housing is a part of a display apparatus.

19. The cover opening and closing device according to claim 11, wherein the housing is installed in a movable body.

20. The cover opening and closing device according to claim 11, wherein
the guide has an opening,
the housing includes a transmission part, and
when the cover is at the first position, the object, the opening, the cover, and the transmission part are aligned.

* * * * *